United States Patent
Chen et al.

(10) Patent No.: US 12,133,222 B2
(45) Date of Patent: Oct. 29, 2024

(54) METHOD FOR SEMI-PERSISTENT GRANTED UPLINK TRANSMISSION, TERMINAL DEVICE, AND NETWORK SIDE DEVICE

(71) Applicant: VIVO MOBILE COMMUNICATION CO., LTD., Guangdong (CN)

(72) Inventors: Xiaohang Chen, Chang'an Dongguan (CN); Lei Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 735 days.

(21) Appl. No.: 17/154,587

(22) Filed: Jan. 21, 2021

(65) Prior Publication Data

US 2021/0144741 A1  May 13, 2021

Related U.S. Application Data

(63) Continuation of application No. PCT/CN2019/096687, filed on Jul. 19, 2019.

(30) Foreign Application Priority Data

Jul. 23, 2018 (CN) .......................... 201810813931.1

(51) Int. Cl.
*H04W 72/12* (2023.01)
*H04W 16/14* (2009.01)
(Continued)

(52) U.S. Cl.
CPC ........... *H04W 72/21* (2023.01); *H04W 16/14* (2013.01); *H04W 72/0453* (2013.01); *H04W 72/23* (2023.01)

(58) Field of Classification Search
CPC . H04W 72/21; H04W 72/23; H04W 72/0453; H04W 16/14
(Continued)

(56) References Cited

U.S. PATENT DOCUMENTS 11,432,316 B2 * 8/2022 Park ...................... H04W 72/23
2014/0073356 A1  3/2014 Siomina et al.
(Continued)

FOREIGN PATENT DOCUMENTS

| CN | 103428876 A | 12/2013 |
| CN | 106507486 A | 3/2017 |

(Continued)

OTHER PUBLICATIONS

CN Office Action in Application No. 201810813931.1 dated May 28, 2020.
(Continued)

*Primary Examiner* — Faisal Choudhury
(74) *Attorney, Agent, or Firm* — Price Heneveld LLP

(57) ABSTRACT

Disclosed in embodiments of the present application are a semi-persistent grant uplink transmission method, terminal device and a network-side device. The method comprises: receiving configuration information, wherein the configuration information is used to configure a plurality of semi-persistent grant resources, each of the plurality of semi-persistent grant resources corresponds to at least one unlicensed sub-band.

12 Claims, 3 Drawing Sheets

(51) Int. Cl.
*H04W 72/0453* (2023.01)
*H04W 72/21* (2023.01)
*H04W 72/23* (2023.01)

(58) Field of Classification Search
USPC .......................................................... 370/329
See application file for complete search history.

(56) References Cited

U.S. PATENT DOCUMENTS

| | | | |
|---|---|---|---|
| 2017/0171857 A1 | 6/2017 | Lee et al. | |
| 2017/0374637 A1 | 12/2017 | Akkarakaran et al. | |
| 2018/0183551 A1 | 6/2018 | Chou et al. | |
| 2020/0022174 A1* | 1/2020 | Karaki | H04W 72/0453 |
| 2020/0120720 A1* | 4/2020 | Wu | H04W 72/04 |
| 2020/0403762 A1* | 12/2020 | Jiang | H04L 5/0053 |
| 2021/0007101 A1* | 1/2021 | Tooher | H04W 24/08 |
| 2021/0050972 A1* | 2/2021 | Zheng | H04W 72/541 |

FOREIGN PATENT DOCUMENTS

| | | | | |
|---|---|---|---|---|
| CN | 106664591 A | | 5/2017 | |
| CN | 107360617 A | | 11/2017 | |
| CN | 108023705 A | | 5/2018 | |
| CN | 111165048 A | * | 5/2020 | ............ H04L 5/0007 |
| JP | 2020503764 A | | 1/2020 | |
| WO | 2011/034321 A2 | | 3/2011 | |
| WO | 2017195495 A1 | | 11/2017 | |
| WO | 2018/048237 A1 | | 3/2018 | |

OTHER PUBLICATIONS

CN Search Report in Application No. 201810813931.1 dated Apr. 16, 2020.
"UTDOA positioning for Nb-Iot", 3GPP TSG RAN WG1 Meeting #88, R1-1701907, ZTE, Feb. 13, 2017.
"BWP operation in unlicensed spectrum" 3GPP RAN WG1 Meeting #92bis, R1-1804680, InterDigital Inc., Apr. 16, 2018.
"BWP operation in unlicensed spectrum" 3GPP RAN WG1 Meeting #93, R1-1806968, InterDiggital Inc., May 21, 2018.
International Search Report and Written Opinion in Application No. PCT/CN2019/096687 dated Feb. 4, 2021.
EP Search Report in Application No. 19840430.3 dated Sep. 2, 2021.
"On Autonomous UL Transmissions for NR-U" 3GPP TSG-RAN WG2 AdHoc 1807, Tdoc R2-1810403, Ericsson, Jul. 2, 2018.
JP Office Action in Application No. 2021-503917 Dated May 10, 2022.
"Discussion on the enhancements to configured grants" 3GPP TSG RAN WG1 Meeting #94, vivo, R1-1808240, Aug. 20, 2018.

* cited by examiner

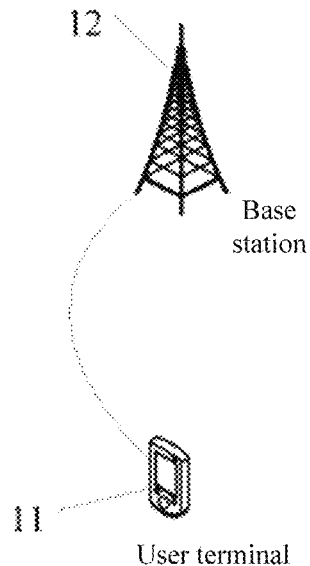

FIG. 1

Receive configuration information, where the configuration information is used to configure a plurality of semi-persistently granted resources, and each of the plurality of semi-persistently granted resources corresponds to at least one unlicensed subband — S210

FIG. 2

Send configuration information, where the configuration information is used to configure a plurality of semi-persistently granted resources for a terminal device, and each of the plurality of semi-persistently granted resources corresponds to at least one unlicensed subband — S310

FIG. 3

METHOD FOR SEMI-PERSISTENT GRANTED UPLINK TRANSMISSION, TERMINAL DEVICE, AND NETWORK SIDE DEVICE

CROSS-REFERENCE TO RELATED APPLICATION

The present application is a continuation application of International Application No. PCT/CN2019/096687 filed on Jul. 19, 2019, which claims priority of Chinese Patent Application No. 201810813931.1 filed on Jul. 23, 2018 in China, both of which are incorporated herein by reference in their entireties.

TECHNICAL FIELD

The present disclosure relates to the communications field, and in particular, to a method for semi-persistent granted uplink transmission, a terminal device, and a network side device.

BACKGROUND

In the fifth-generation (5G) mobile communications system, that is, new radio (New Radio, NR), an unlicensed band (unlicensed band) may serve as supplement of a licensed band (licensed band), to help a carrier perform service capacity expansion. Because the unlicensed band is shared by a plurality of technologies such as WiFi, radar, and LTE-LAA, it is necessary to comply with the listen before talk (listen before talk, LTB) rule when the unlicensed band is used. That is, channel monitoring is performed before data transmission, and data transmission can be performed only when a monitoring result is that a channel is idle, to ensure that all devices can fairly use resources of the unlicensed band.

In the process of semi-persistent granted uplink transmission, if the channel monitoring result is that the channel is busy, a terminal device cannot perform uplink transmission at a transmission moment of a semi-persistent granted resource (Configured Grant Resource). The terminal device needs to continue channel monitoring, and can perform uplink transmission only when the channel monitoring result is that the channel is idle at the transmission moment of the semi-persistent granted resource. As a result, a delay of the semi-persistent granted uplink transmission is relatively long.

SUMMARY

Some embodiments of the present disclosure aim to provide a method for semi-persistent granted uplink transmission, a terminal device, and a network side device, to resolve the related-art problem that a delay of semi-persistent granted uplink transmission is relatively long.

According to a first aspect, some embodiments of the present disclosure provide a method for semi-persistent granted uplink transmission, applied to a terminal device. The method includes:
  receiving configuration information, where the configuration information is used to configure a plurality of semi-persistent granted resources, where
  each of the plurality of semi-persistent granted resources corresponds to at least one subband of an unlicensed band.

According to a second aspect, some embodiments of the present disclosure further provide a method for semi-persistent granted uplink transmission, applied to a network side device. The method includes:
  sending configuration information, where the configuration information is used to configure a plurality of semi-persistent granted resources for a terminal device, where
  each of the plurality of semi-persistent granted resources corresponds to at least one subband of an unlicensed band.

According to a third aspect, some embodiments of the present disclosure further provide a terminal device, including:
  a receiving module, configured to receive configuration information, where the configuration information is used to configure a plurality of semi-persistent granted resources, where
  each of the plurality of semi-persistent granted resources corresponds to at least one subband of an unlicensed band.

According to a fourth aspect, some embodiments of the present disclosure further provide a terminal device. The terminal device includes: a processor, a memory, and a computer program stored in the memory and executable on the processor. When the computer program is executed by the processor, the steps of the method for semi-persistent granted uplink transmission according to the first aspect are performed.

According to a fifth aspect, some embodiments of the present disclosure further provide a computer-readable storage medium, where the computer-readable storage medium stores a computer program. When the computer program is executed by a processor, the steps of the method for semi-persistent granted uplink transmission according to the first aspect are performed.

According to a sixth aspect, some embodiments of the present disclosure further provide a network side device, including:
  a sending module, configured to send configuration information, where the configuration information is used to configure a plurality of semi-persistent granted resources for a terminal device, where
  each of the plurality of semi-persistent granted resources corresponds to at least one subband of an unlicensed band.

According to a seventh aspect, some embodiments of the present disclosure further provide a network side device. The network side device includes: a processor, a memory, and a computer program stored in the memory and executable on the processor. When the computer program is executed by the processor, the steps of the method for semi-persistent granted uplink transmission according to the second aspect are performed.

According to an eighth aspect, some embodiments of the present disclosure further provide a computer-readable storage medium, where the computer-readable storage medium stores a computer program. When the computer program is executed by a processor, the steps of the method for semi-persistent granted uplink transmission according to the second aspect are performed.

In some embodiments of the present disclosure, the configuration information is used to configure the plurality of semi-persistent granted resources for the terminal device, where each semi-persistent granted resource corresponds to at least one subband of an unlicensed band. In this way, when not all channels of the unlicensed band are busy, the terminal device can quickly access the unlicensed band by using a semi-persistent granted resource corresponding to a subband that is of the unlicensed band and that has an idle channel, thereby effectively reducing a delay of the semi-persistent granted uplink transmission.

BRIEF DESCRIPTION OF THE DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings:

FIG. 1 is a schematic diagram of a network architecture according to some embodiments of the present disclosure;

FIG. 2 is a schematic flowchart of a method for semi-persistent granted uplink transmission according to some embodiments of the present disclosure;

FIG. 3 is a schematic flowchart of another method for semi-persistent granted uplink transmission according to some embodiments of the present disclosure;

DETAILED DESCRIPTION

Figure 4:
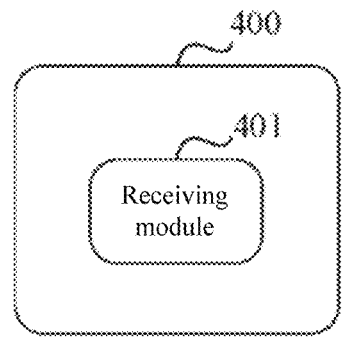
FIG. 4 is a schematic structural diagram of a terminal device according to some embodiments of the present disclosure.

The following clearly and completely describes the technical solutions in some embodiments of the present disclosure with reference to the accompanying drawings in some embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Referring to FIG. 1, FIG. 1 is a schematic diagram of a network architecture according to some embodiments of the present disclosure. As shown in FIG. 1, the network architecture includes a user terminal 11 and a base station 12. The user terminal 11 may be a terminal device (User Equipment, UE), for example, may be a terminal side device such as a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that a specific type of the user terminal 11 is not limited in some embodiments of the present disclosure. The base station 12 may be a base station in 5G or later releases (for example, a gNB or a 5G NR NB) or a base station in other communications systems, or is referred to as a NodeB. It should be noted that in some embodiments of the present disclosure, only the 5G base station is used as an example, but a specific type of the base station 12 is not limited.

It should be noted that specific functions of the user terminal 11 and the base station 12 are described in detail in the following plurality of embodiments.

FIG. 2 is a schematic flowchart of a method for semi-persistent granted uplink transmission according to some embodiments of the present disclosure. The method is applied to a terminal device, and may be described as follows:

Step 210. Receive configuration information, where the configuration information is used to configure a plurality of semi-persistent granted resources, and each of the plurality of semi-persistent granted resources corresponds to at least one subband of an unlicensed band.

Different semi-persistent granted resources correspond to different subbands of the unlicensed band.

In some embodiments of the present disclosure, the method further includes:

activating one or more of the plurality of semi-persistent granted resources.

A network side device configures the plurality of semi-persistent granted resources for the terminal device by using the configuration information, and one or more of the plurality of semi-persistent granted resources are activated. In this way, when not all channels of the unlicensed band are busy, the terminal device can quickly access the unlicensed band by using a semi-persistent granted resource corresponding to a subband that is of the unlicensed band and that has an idle channel.

The one or more of the plurality of semi-persistent granted resources are activated in at least the following three manners:

In a first manner:

In some embodiments of the present disclosure, the activating one or more of the plurality of semi-persistent granted resources includes:

receiving high-layer signaling, where the high-layer signaling is used to configure and activate the plurality of semi-persistent granted resources and the at least one subband of the unlicensed band that corresponds to each semi-persistent granted resource.

The high-layer signaling includes: radio resource control (Radio Resource Control, RRC) signaling.

The terminal device receives the high-layer signaling sent by the network side device. The high-layer signaling includes identifier information and configuration information that correspond to each of the plurality of semi-persistent granted resources configured by the network side device for the terminal device. The configuration information that corresponds to each semi-persistent granted resource includes parameters such as a period and a time-frequency resource of the semi-persistent granted resource.

According to the time-frequency resource parameter of each semi-persistent granted resource, the terminal device may determine at least one subband of the unlicensed band that is configured by the network side device and that corresponds to the semi-persistent granted resource.

That is, after receiving the high-layer signaling sent by the network side device, the terminal device may configure and activate the plurality of semi-persistent granted resources according to the high-layer signaling, and no longer needs to receive any other activation signaling.

For example, the terminal device receives RRC signaling sent by the network side device. The RRC signaling includes: identifier information and configuration information that correspond to a first semi-persistent granted resource, identifier information and configuration information that correspond to a second semi-persistent granted resource, and identifier information and configuration information that correspond to a third semi-persistent granted resource.

That is, the network side device configures and activates three semi-persistent granted resources for the terminal device by using the RRC signaling.

The configuration information corresponding to the first semi-persistent granted resource includes a first time-frequency resource parameter. According to the first time-frequency resource parameter, the terminal device may determine that subbands of the unlicensed band that are configured by the network side device and that correspond to the first semi-persistent granted resource are: a subband 1 and a subband 3. The configuration information corresponding to the second semi-persistent granted resource includes a second time-frequency resource parameter. According to the second time-frequency resource parameter, the terminal device may determine that subbands of the unlicensed band that are configured by the network side device and that correspond to the second semi-persistent granted resource are: a subband 2 and a subband 4. The configuration information corresponding to the third semi-persistent granted resource includes a third time-frequency resource parameter. According to the third time-frequency resource parameter, the terminal device may determine that subbands of the unlicensed band that are configured by the network side device and that correspond to the third semi-persistent granted resource are: the subband 1, the subband 2, and the subband 4.

In a second manner:

In some embodiments of the present disclosure, the activating one or more of the plurality of semi-persistent granted resources includes:

receiving high-layer signaling, where the high-layer signaling is used to configure the plurality of semi-persistent granted resources; and receiving downlink activation signaling, where the downlink activation signaling is used to indicate activation resource identifier information, and indicate at least one subband of the unlicensed band for a semi-persistent granted resource corresponding to the activation resource identifier information, and the activation resource identifier information is used to instruct to activate the semi-persistent granted resource corresponding to the activation resource identifier information.

First, the terminal device receives the high-layer signaling sent by the network side device. The high-layer signaling includes identifier information and first configuration information that correspond to each of the plurality of semi-persistent granted resources configured by the network side device for the terminal device.

The first configuration information corresponding to each semi-persistent granted resource includes some parameters such as a period of the semi-persistent granted resource.

Then, the terminal device receives the downlink activation signaling sent by the network side device. The downlink activation signaling includes the activation resource identifier information and second configuration information.

According to the activation resource identifier information, the terminal device activates the semi-persistent granted resource corresponding to the activation resource identifier information. The second configuration information includes a transmission-related parameter that is configured by the network side device for the semi-persistent granted resource corresponding to the activation resource identifier information, for example, a time-frequency resource parameter and a modulation and coding scheme (Modulation and Coding Scheme, MCS) parameter. According to the time-frequency resource parameter, the terminal device may determine at least one subband of the unlicensed band that is configured by the network side device for the semi-persistent granted resource corresponding to the activation resource identifier information.

For example, the terminal device first receives RRC signaling sent by the network side device. The RRC signaling includes: identifier information and first configuration information that correspond to a first semi-persistent granted resource, identifier information and first configuration information that correspond to a second semi-persistent granted resource, and identifier information and first configuration information that correspond to a third semi-persistent granted resource.

That is, the network side device configures three semi-persistent granted resources for the terminal device by using the RRC signaling.

Then, the terminal device receives the downlink activation signaling sent by the network side device. The downlink activation signaling includes: identifier information and second configuration information that correspond to the first semi-persistent granted resource, and the second configuration information includes a first time-frequency resource parameter.

The terminal device activates the first semi-persistent granted resource according to the identifier information corresponding to the first semi-persistent granted resource. According to the first time-frequency resource parameter in the second configuration information, the terminal device may determine that subbands of the unlicensed band that are configured by the network side device and that correspond to the first semi-persistent granted resource are: a subband 1, a subband 3, and a subband 4.

It should be noted that the terminal device may receive one or more pieces of downlink activation signaling. This is not specifically limited herein.

When the terminal device receives a plurality of pieces of downlink activation signaling, according to activation resource identifier information included in each piece of downlink activation signaling, the terminal device activates a semi-persistent granted resource corresponding to the activation resource identifier information. According to a time-frequency resource parameter in second configuration information included in each piece of downlink activation signaling, the terminal device determines at least one subband of the unlicensed band that is configured by the network side device for the semi-persistent granted resource corresponding to the activation resource identifier information.

An example in which the network side device configures three semi-persistent granted resources for the terminal device by using the RRC signaling is still used. The terminal device receives first downlink activation signaling and second downlink activation signaling sent by the network side device.

The first downlink activation signaling includes: identifier information and second configuration information that correspond to the first semi-persistent granted resource. The terminal device activates the first semi-persistent granted resource according to the identifier information corresponding to the first semi-persistent granted resource. The second configuration information corresponding to the first semi-persistent granted resource includes the first time-frequency resource parameter. According to the first time-frequency resource parameter, the terminal device may determine that the subband of the unlicensed band that is configured by the network side device for the first semi-persistent granted resource is: a subband 1, a subband 3, and a subband 4.

The second downlink activation signaling includes: identifier information and second configuration information that correspond to a third semi-persistent granted resource. The terminal device activates the third semi-persistent granted resource according to the identifier information corresponding to the third semi-persistent granted resource. The second configuration information corresponding to the third semi-persistent granted resource includes a third time-frequency resource parameter. According to the third time-frequency resource parameter, the terminal device may determine that subbands of the unlicensed band that are configured by the network side device for the third semi-persistent granted resource are: a subband 2 and a subband 3.

The downlink activation signaling is used, so that the network side device can activate one or more of the plurality of semi-persistent granted resources more flexibly, and configure transmission-related parameter information more flexibly for a semi-persistent granted resource that needs to be activated.

In some embodiments of the present disclosure, the network side device can update some pieces of parameter information of a semi-persistent granted resource in the activated state in the terminal device by using the downlink activation signaling.

For example, the semi-persistent granted resource in the activated state in the terminal device is the first semi-persistent granted resource and the second semi-persistent granted resource. The subband of the unlicensed band that corresponds to the first semi-persistent granted resource is: a subband 1 and a subband 3, and the subband of the unlicensed band that corresponds to the second semi-persistent granted resource is: a subband 2 and a subband 4.

The terminal device receives the downlink activation signaling sent by the network side device. The downlink activation signaling includes: identifier information and second configuration information that correspond to the first semi-persistent granted resource, the second configuration information includes a first time-frequency resource parameter, and the first time-frequency resource parameter is different from a current time-frequency resource parameter of the first semi-persistent granted resource.

In this case, the terminal device updates the time-frequency resource parameter of the first semi-persistent granted resource to the first time-frequency resource parameter. Therefore, according to the first time-frequency resource parameter, the terminal device may determine that the subband of the unlicensed band that is reconfigured by the network side device for the first semi-persistent granted resource is: a subband 1, a subband 2, and a subband 4.

The network side device not only can activate one semi-persistent granted resource by using one piece of downlink activation signaling, but also can update a part of parameter information of the semi-persistent granted resource in the activated state by using one or more pieces of downlink activation signaling, for example, update a time-frequency resource parameter of the semi-persistent granted resource. In this way, the subband of the unlicensed band that is reconfigured by the network side device for the semi-persistent granted resource is determined according to the updated time-frequency resource parameter.

If receiving a plurality of pieces of downlink activation signaling, the terminal device updates some parameters of the semi-persistent granted resource in the activated state according to the most recently received downlink activation signaling.

It should be noted that the downlink activation signaling not only can be used to update the time-frequency resource parameter of the semi-persistent granted resource in the activated state, but also can be used to update another parameter according to an actual transmission requirement. This is not specifically limited herein.

In a third manner:

In some embodiments of the present disclosure, the activating one or more of the plurality of semi-persistent granted resources includes:

receiving high-layer signaling, where the high-layer signaling is used to configure the plurality of semi-persistent granted resources and the at least one subband of the unlicensed band that corresponds to each semi-persistent granted resource; and receiving downlink activation signaling, where the downlink activation signaling is used to indicate at least one piece of activation resource identifier information, and the at least one piece of activation resource identifier information is used to instruct to activate a semi-persistent granted resource corresponding to each of the at least one piece of activation resource identifier information.

First, the terminal device receives the high-layer signaling sent by the network side device. The high-layer signaling includes identifier information and configuration information that correspond to each of the plurality of semi-persistent granted resources configured by the network side device for the terminal device.

The configuration information corresponding to each semi-persistent granted resource includes a time-frequency resource parameter of the semi-persistent granted resource. According to the time-frequency resource parameter of each semi-persistent granted resource, the terminal device may determine at least one subband of the unlicensed band that is configured by the network side device for the semi-persistent granted resource.

That is, the network side device configures a plurality of semi-persistent granted resources for the terminal device by using the RRC signaling, and configures, for each semi-persistent granted resource, at least one subband of the unlicensed band that corresponds to the semi-persistent granted resource.

Then, the terminal device receives the downlink activation signaling sent by the network side device. The downlink activation signaling includes at least one piece of activation resource identifier information.

The terminal device activates, according to the at least one piece of activation resource identifier information, a semi-persistent granted resource corresponding to each of the at least one piece of activation resource identifier information.

For example, the terminal device first receives RRC signaling sent by the network side device. The RRC signaling includes: identifier information and configuration information that correspond to a first semi-persistent granted resource, identifier information and configuration information that correspond to a second semi-persistent granted resource, and identifier information and configuration information that correspond to a third semi-persistent granted resource.

The configuration information corresponding to the first semi-persistent granted resource includes a first time-frequency resource parameter. According to the first time-frequency resource parameter, the terminal device may determine that subbands of the unlicensed band that are configured by the network side device for the first semi-persistent granted resource are: a subband 1 and a subband 3. The configuration information corresponding to the second semi-persistent granted resource includes a second time-frequency resource parameter. According to the second time-frequency resource parameter, the terminal device may determine that subbands of the unlicensed band that are configured by the network side device for the second semi-persistent granted resource are: a subband 2 and a subband 4. The configuration information corresponding to the third semi-persistent granted resource includes a third time-frequency resource parameter. According to the third time-frequency resource parameter, the terminal device may determine that subbands of the unlicensed band that are configured by the network side device for the third semi-persistent granted resource are: the subband 1, the subband 2, and the subband 4.

Then, the terminal device receives the downlink activation signaling sent by the network side device. The downlink activation signaling includes: identifier information corresponding to the first semi-persistent granted resource and identifier information corresponding to the second semi-persistent granted resource.

The terminal device activates the first semi-persistent granted resource according to the identifier information corresponding to the first semi-persistent granted resource in the downlink activation signaling. The terminal device activates the second semi-persistent granted resource according to the identifier information corresponding to the second semi-persistent granted resource in the downlink activation signaling.

The plurality of semi-persistent granted resources and the at least one subband of the unlicensed band that corresponds to each semi-persistent granted resource are configured for the terminal device by using the high-layer signaling. Further, one or more of the plurality of semi-persistent granted resources are activated by using the downlink activation signaling. In this way, one or more of the plurality of semi-persistent granted resources can be flexibly activated. In addition, this can avoid that when the at least one subband of the unlicensed band is configured for the semi-persistent granted resource by using the downlink activation signaling, signaling load may be excessively high.

In some embodiments of the present disclosure, the method further includes:
performing channel monitoring on at least one subband of the unlicensed band that corresponds to a semi-persistent granted resource in an activated state;
determining a target semi-persistent granted resource, where a channel monitoring result of at least one subband of the unlicensed band that corresponds to the target semi-persistent granted resource is idle; and
sending an uplink data channel on the target semi-persistent granted resource.

The uplink data channel carries uplink control information (Uplink Control Information, UCI), and the UCI includes identifier information of the target semi-persistent granted resource.

For example, the semi-persistent granted resource in the activated state is the first semi-persistent granted resource and the second semi-persistent granted resource. The subband of the unlicensed band that corresponds to the first semi-persistent granted resource is: a subband 1 and a subband 3, and the subband of the unlicensed band that corresponds to the second semi-persistent granted resource is: a subband 2 and a subband 4.

The terminal device performs channel monitoring on the subband 1, the subband 2, the subband 3, and the subband 4 of the unlicensed band. If a channel monitoring result of the subband 1 and the subband 3 is busy and a channel monitoring result of the subband 2 and the subband 4 is idle, the terminal device determines the second semi-persistent granted resource as the target semi-persistent granted resource.

The terminal device sends the uplink data channel to the network side device on the target semi-persistent granted resource (the second semi-persistent granted resource). The uplink data channel carries UCI, and the UCI includes the identifier information of the target semi-persistent granted resource (the second semi-persistent granted resource).

It should be noted that the terminal device not only can send the uplink data channel on the target semi-persistent granted resource, but also can send an uplink control channel on the target semi-persistent granted resource. This is not specifically limited herein.

Optionally, the terminal device sends the uplink data channel (or the uplink control channel) on different semi-persistent granted resources by using the same transmit power.

In some embodiments of the present disclosure, the method further includes:
deactivating one or more of semi-persistent granted resources in an activated state.

After configuring and activating the plurality of semi-persistent granted resources for the terminal device, the network side device may further deactivate one or more of semi-persistent granted resources in an activated state according to an actual data transmission requirement.

One or more of semi-persistent granted resources in an activated state are deactivated in at least the following two manners:

In a first manner:
In some embodiments of the present disclosure, the deactivating one or more of semi-persistent granted resources in an activated state includes:
receiving high-layer signaling, where the high-layer signaling is used to deactivate the one or more of the semi-persistent granted resources in the activated state.

The terminal device receives high-layer signaling sent by the network side device, and may deactivate the one or more of the semi-persistent granted resources in the activated state according to the high-layer signaling.

In a second manner:
In some embodiments of the present disclosure, the deactivating one or more of semi-persistent granted resources in an activated state includes:
receiving downlink deactivation signaling, where the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

The terminal device receives the downlink deactivation signaling sent by the network side device. The downlink deactivation signaling includes at least one piece of deactivation resource identifier information. The terminal device deactivates, according to the at least one piece of deactivation resource identifier information, a semi-persistent granted resource corresponding to each of the at least one piece of deactivation resource identifier information.

For example, the semi-persistent granted resource in the activated state in the terminal device is: the first semi-persistent granted resource, the second semi-persistent granted resource, and the third semi-persistent granted resource.

The terminal device receives the downlink deactivation signaling sent by the network side device. The downlink deactivation signaling includes: identifier information corresponding to the first semi-persistent granted resource and identifier information corresponding to the third semi-persistent granted resource. The terminal device deactivates the first semi-persistent granted resource in the activated state according to the identifier information corresponding to the first semi-persistent granted resource. The terminal device deactivates the third semi-persistent granted resource in the activated state according to the identifier information corresponding to the third semi-persistent granted resource.

It should be noted that the terminal device may receive one or more pieces of downlink deactivation signaling. This is not specifically limited herein.

In the technical solutions described in some embodiments of the present disclosure, the configuration information is used to configure the plurality of semi-persistent granted resources for the terminal device, where each semi-persistent granted resource corresponds to at least one subband of an unlicensed band. In this way, when not all channels of the unlicensed band are busy, the terminal device can quickly access the unlicensed band by using a semi-persistent granted resource corresponding to a subband that is of the unlicensed band and that has an idle channel, thereby effectively reducing a delay of the semi-persistent granted uplink transmission.

FIG. 3 is a schematic flowchart of a method for semi-persistent granted uplink transmission according to some embodiments of the present disclosure. The method is applied to a network side device, and may be described as follows:

Step 310. Send configuration information, where the configuration information is used to configure a plurality of semi-persistent granted resources for a terminal device, and each of the plurality of semi-persistent granted resources corresponds to at least one subband of an unlicensed band.

Different semi-persistent granted resources correspond to different subbands of the unlicensed band.

In some embodiments of the present disclosure, the method further includes:
  activating one or more of the plurality of semi-persistent granted resources.

The network side device configures the plurality of semi-persistent granted resources for the terminal device by using the configuration information, and one or more of the plurality of semi-persistent granted resources are activated. In this way, when not all channels of the unlicensed band are busy, the terminal device can quickly access the unlicensed band by using a semi-persistent granted resource corresponding to a subband that is of the unlicensed band and that has an idle channel.

The one or more of the plurality of semi-persistent granted resources are activated in at least the following three manners:

In a first manner:

In some embodiments of the present disclosure, the activating one or more of the plurality of semi-persistent granted resources includes:
  sending high-layer signaling, where the high-layer signaling is used to configure and activate the plurality of semi-persistent granted resources and the at least one subband of the unlicensed band that corresponds to each semi-persistent granted resource.

The high-layer signaling includes: RRC signaling.

The network side device sends the high-layer signaling to the terminal device. The high-layer signaling includes identifier information and configuration information that correspond to each of the plurality of semi-persistent granted resources configured by the network side device for the terminal device. The configuration information corresponding to each semi-persistent granted resource includes parameters such as a period and a time-frequency resource of the semi-persistent granted resource.

According to the time-frequency resource parameter of each semi-persistent granted resource, at least one subband of the unlicensed band that is configured by the network side device for the terminal device and that corresponds to the semi-persistent granted resource may be determined.

That is, the network side device may configure and activate the plurality of semi-persistent granted resources for the terminal device by using the high-layer signaling, and no longer needs to send any other activation signaling to the terminal device.

In a second manner:

In some embodiments of the present disclosure, the activating one or more of the plurality of semi-persistent granted resources includes:
  sending high-layer signaling, where the high-layer signaling is used to configure the plurality of semi-persistent granted resources; and
  sending downlink activation signaling, where the downlink activation signaling is used to indicate activation resource identifier information, and indicate at least one subband of the unlicensed band for a semi-persistent granted resource corresponding to the activation resource identifier information, and the activation resource identifier information is used to instruct to activate the semi-persistent granted resource corresponding to the activation resource identifier information.

The network side device first sends the high-layer signaling to the terminal device. The high-layer signaling includes identifier information and first configuration information that correspond to each of the plurality of semi-persistent granted resources configured by the network side device for the terminal device.

The first configuration information corresponding to each semi-persistent granted resource includes some parameters such as a period of the semi-persistent granted resource.

Then, the network side device sends the downlink activation signaling to the terminal device. The downlink activation signaling includes the activation resource identifier information and second configuration information.

According to the activation resource identifier information, the terminal device may activate the semi-persistent granted resource corresponding to the activation resource identifier information. The second configuration information includes a transmission-related parameter that is configured by the network side device for the semi-persistent granted resource corresponding to the activation resource identifier information, for example, a time-frequency resource parameter and an MCS parameter. According to the time-frequency resource parameter, the terminal device may determine at least one subband of the unlicensed band that is configured by the network side device for the semi-persistent granted resource corresponding to the activation resource identifier information.

It should be noted that the network side device may send one or more pieces of downlink activation signaling to the terminal device. This is not specifically limited herein.

When the network side device sends a plurality of pieces of downlink activation signaling to the terminal device, according to activation resource identifier information included in each piece of downlink activation signaling, the terminal device activates a semi-persistent granted resource corresponding to the activation resource identifier information. According to a time-frequency resource parameter in second configuration information included in each piece of downlink activation signaling, the terminal device determines at least one subband of the unlicensed band that is configured by the network side device for the semi-persistent granted resource corresponding to the activation resource identifier information.

The downlink activation signaling is used, so that the network side device can activate one or more of the plurality of semi-persistent granted resources more flexibly, and configure transmission-related parameter information more flexibly for a semi-persistent granted resource that needs to be activated.

In some embodiments of the present disclosure, the network side device can update some pieces of parameter information of a semi-persistent granted resource in the activated state in the terminal device by using the downlink activation signaling.

For example, the semi-persistent granted resource in the activated state in the terminal device is the first semi-persistent granted resource and the second semi-persistent granted resource. The subband of the unlicensed band that corresponds to the first semi-persistent granted resource is: a subband 1 and a subband 3, and the subband of the unlicensed band that corresponds to the second semi-persistent granted resource is: a subband 2 and a subband 4.

The network side device sends the downlink activation signaling to the terminal device. The downlink activation signaling includes: identifier information and second configuration information that correspond to the first semi-persistent granted resource, the second configuration information includes a first time-frequency resource parameter, and the first time-frequency resource parameter is different from a current time-frequency resource parameter of the first semi-persistent granted resource.

In this case, the terminal device updates the time-frequency resource parameter of the first semi-persistent granted resource to the first time-frequency resource parameter according to the received downlink activation signaling. Therefore, according to the first time-frequency resource parameter, the terminal device may determine that the subband of the unlicensed band that is reconfigured by the network side device for the first semi-persistent granted resource is: a subband 1, a subband 2, and a subband 4.

The network side device not only can activate one semi-persistent granted resource by using one piece of downlink activation signaling, but also can update a part of parameter information of the semi-persistent granted resource in the activated state by using one or more pieces of downlink activation signaling, for example, update a time-frequency resource parameter of the semi-persistent granted resource. In this way, the terminal device may determine, according to the updated time-frequency resource parameter, the subband of the unlicensed band that is reconfigured by the network side device for the semi-persistent granted resource.

If the network side device sends a plurality of pieces of downlink activation signaling to the terminal device, the terminal device may update some parameters of the semi-persistent granted resource in the activated state according to the most recently received downlink activation signaling.

It should be noted that the downlink activation signaling not only can be used to update the time-frequency resource parameter of the semi-persistent granted resource in the activated state, but also can be used to update another parameter according to an actual transmission requirement. This is not specifically limited herein.

In a third manner:

In some embodiments of the present disclosure, the activating one or more of the plurality of semi-persistent granted resources includes:

sending high-layer signaling, where the high-layer signaling is used to configure the plurality of semi-persistent granted resources and the at least one subband of the unlicensed band that corresponds to each semi-persistent granted resource; and sending downlink activation signaling, where the downlink activation signaling is used to indicate at least one piece of activation resource identifier information, and the at least one piece of activation resource identifier information is used to instruct to activate a semi-persistent granted resource corresponding to each of the at least one piece of activation resource identifier information.

First, the network side device sends the high-layer signaling to the terminal device. The high-layer signaling includes identifier information and configuration information that correspond to each of the plurality of semi-persistent granted resources configured by the network side device for the terminal device.

The configuration information corresponding to each semi-persistent granted resource includes a time-frequency resource parameter of the semi-persistent granted resource. According to the time-frequency resource parameter of each semi-persistent granted resource, the terminal device may determine at least one subband of the unlicensed band that is configured by the network side device for the semi-persistent granted resource.

That is, the network side device configures a plurality of semi-persistent granted resources for the terminal device by using the RRC signaling, and configures, for each semi-persistent granted resource, at least one subband of the unlicensed band that corresponds to the semi-persistent granted resource.

Then, the network side device sends the downlink activation signaling to the terminal device. The downlink activation signaling includes at least one piece of activation resource identifier information.

The terminal device activates, according to the at least one piece of activation resource identifier information, a semi-persistent granted resource corresponding to each of the at least one piece of activation resource identifier information.

The plurality of semi-persistent granted resources and the at least one subband of the unlicensed band that corresponds to each semi-persistent granted resource are configured for the terminal device by using the high-layer signaling. Further, one or more of the plurality of semi-persistent granted resources are activated by using the downlink activation signaling. In this way, one or more of the plurality of semi-persistent granted resources can be flexibly activated. In addition, this can avoid that when the at least one subband of an unlicensed band is configured for the semi-persistent granted resource by using the downlink activation signaling, signaling load may be excessively high.

In some embodiments of the present disclosure, the method further includes:

receiving an uplink data channel on the target semi-persistent granted resource.

The uplink data channel carries UCI, and the UCI includes identifier information of the target semi-persistent granted resource.

The terminal device performs channel monitoring on a subband of the unlicensed band, to determine a target semi-persistent granted resource corresponding to a subband whose channel monitoring result is idle, and sends the uplink data channel on the target semi-persistent granted resource, so that the network side device may receive the uplink data channel on the target semi-persistent granted resource.

It should be noted that the network side device not only can receive the uplink data channel on the target semi-persistent granted resource, but also can receive an uplink control channel on the target semi-persistent granted resource. This is not specifically limited herein.

In some embodiments of the present disclosure, the method further includes:
  deactivating one or more of semi-persistent granted resources in an activated state.

After configuring and activating the plurality of semi-persistent granted resources for the terminal device, the network side device may further deactivate one or more of semi-persistent granted resources in an activated state according to an actual data transmission requirement.

One or more of the semi-persistent granted resources in the activated state are deactivated in at least the following two manners:

In a first manner:

In some embodiments of the present disclosure, the deactivating one or more of semi-persistent granted resources in an activated state includes:
  sending high-layer signaling, where the high-layer signaling is used to deactivate the one or more of the semi-persistent granted resources in the activated state.

The network side device sends the high-layer signaling to the terminal device, and the terminal device may deactivate the one or more of the semi-persistent granted resources in the activated state according to the high-layer signaling.

In a second manner:

In some embodiments of the present disclosure, the deactivating one or more of semi-persistent granted resources in an activated state includes:
  sending downlink deactivation signaling, where the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

The network side device sends the downlink deactivation signaling to the terminal device, where the downlink deactivation signaling includes at least one piece of deactivation resource identifier information, so that the terminal device may deactivate, according to the at least one piece of deactivation resource identifier information, the semi-persistent granted resource corresponding to each of the at least one piece of deactivation resource identifier information.

It should be noted that the network side device may send one or more pieces of downlink deactivation signaling to the terminal device. This is not specifically limited herein.

In the technical solutions described in some embodiments of the present disclosure, the network side device configures the plurality of semi-persistent granted resources for the terminal device by using the configuration information, where each semi-persistent granted resource corresponds to at least one subband of an unlicensed band. In this way, when not all channels of the unlicensed band are busy, the terminal device can quickly access the unlicensed band by using a semi-persistent granted resource corresponding to a subband that is of the unlicensed band and that has an idle channel, thereby effectively reducing a delay of the semi-persistent granted uplink transmission.

FIG. 4 is a schematic structural diagram of a terminal device according to some embodiments of the present disclosure. As shown in FIG. 4, the terminal device 400 includes:
  a receiving module 401, configured to receive configuration information, where the configuration information is used to configure a plurality of semi-persistent granted resources, where
  each of the plurality of semi-persistent granted resources corresponds to at least one subband of an unlicensed band.

Optionally, different semi-persistent granted resources correspond to different subbands of the unlicensed band.

Optionally, the terminal device 400 further includes:
  an activation module, configured to activate one or more of the plurality of semi-persistent granted resources.

Optionally, the activation module is further configured to:
  receive high-layer signaling, where the high-layer signaling is used to configure and activate the plurality of semi-persistent granted resources and the at least one subband of the unlicensed band that corresponds to each semi-persistent granted resource.

Optionally, the activation module is further configured to:
  receive high-layer signaling, where the high-layer signaling is used to configure the plurality of semi-persistent granted resources; and
  receive downlink activation signaling, where the downlink activation signaling is used to indicate activation resource identifier information, and indicate at least one subband of the unlicensed band for a semi-persistent granted resource corresponding to the activation resource identifier information, and the activation resource identifier information is used to instruct to activate the semi-persistent granted resource corresponding to the activation resource identifier information.

Optionally, the activation module is further configured to:
  receive high-layer signaling, where the high-layer signaling is used to configure the plurality of semi-persistent granted resources and the at least one subband of the unlicensed band that corresponds to each semi-persistent granted resource; and
  receive downlink activation signaling, where the downlink activation signaling is used to indicate at least one piece of activation resource identifier information, and the at least one piece of activation resource identifier information is used to instruct to activate a semi-persistent granted resource corresponding to each of the at least one piece of activation resource identifier information.

Optionally, the terminal device 400 further includes:
  a monitoring module, configured to perform channel monitoring on at least one subband of the unlicensed band that corresponds to a semi-persistent granted resource in an activated state;
  a determining module, configured to determine a target semi-persistent granted resource, where a channel monitoring result of at least one subband of the unlicensed band that corresponds to the target semi-persistent granted resource is idle; and a sending module, configured to send an uplink data channel on the target semi-persistent granted resource.

Optionally, the uplink data channel carries UCI, and the UCI includes identifier information of the target semi-persistent granted resource.

Optionally, the terminal device 400 further includes:

a deactivation module, configured to deactivate one or more of semi-persistent granted resources in an activated state.

Optionally, the deactivation module is further configured to:

receive high-layer signaling, where the high-layer signaling is used to deactivate the one or more of the semi-persistent granted resources in the activated state.

Optionally, the deactivation module is further configured to:

receive downlink deactivation signaling, where the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

Optionally, the high-layer signaling includes: RRC signaling.

The terminal device 400 provided in some embodiments of the present disclosure can implement the processes implemented by the terminal device in the method embodiment of FIG. 2. To avoid repetition, details are not described herein again.

Figure 5:
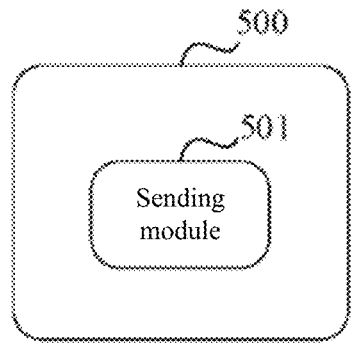
FIG. 5 is a schematic structural diagram of a network side device according to some embodiments of the present disclosure.

FIG. 5 is a schematic structural diagram of a network side device according to some embodiments of the present disclosure. As shown in FIG. 5, the network side device 500 includes:

a sending module 501, configured to send configuration information, where the configuration information is used to configure a plurality of semi-persistent granted resources for a terminal device, where each of the plurality of semi-persistent granted resources corresponds to at least one subband of an unlicensed band.

Optionally, different semi-persistent granted resources correspond to different subbands of the unlicensed band.

Optionally, the network side device 500 further includes:

an activation module, configured to activate one or more of the plurality of semi-persistent granted resources.

Optionally, the activation module is further configured to:

send high-layer signaling, where the high-layer signaling is used to configure and activate the plurality of semi-persistent granted resources and the at least one subband of the unlicensed band that corresponds to each semi-persistent granted resource.

Optionally, the activation module is further configured to:

send high-layer signaling, where the high-layer signaling is used to configure the plurality of semi-persistent granted resources; and send downlink activation signaling, where the downlink activation signaling is used to indicate activation resource identifier information, and indicate at least one subband of the unlicensed band for a semi-persistent granted resource corresponding to the activation resource identifier information, and the activation resource identifier information is used to instruct to activate the semi-persistent granted resource corresponding to the activation resource identifier information.

Optionally, the activation module is further configured to:

send high-layer signaling, where the high-layer signaling is used to configure the plurality of semi-persistent granted resources and the at least one subband of the unlicensed band that corresponds to each semi-persistent granted resource; and send downlink activation signaling, where the downlink activation signaling is used to indicate at least one piece of activation resource identifier information, and the at least one piece of activation resource identifier information is used to instruct to activate a semi-persistent granted resource corresponding to each of the at least one piece of activation resource identifier information.

Optionally, the network side device 500 further includes:

a receiving module, configured to receive an uplink data channel on the target semi-persistent granted resource.

Optionally, the uplink data channel carries UCI, and the UCI includes identifier information of the target semi-persistent granted resource.

Optionally, the network side device 500 further includes:

a deactivation module, configured to deactivate one or more of semi-persistent granted resources in an activated state.

Optionally, the deactivation module is further configured to:

send high-layer signaling, where the high-layer signaling is used to deactivate the one or more of the semi-persistent granted resources in the activated state.

Optionally, the deactivation module is further configured to:

send downlink deactivation signaling, where the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

Optionally, the high-layer signaling includes: RRC signaling.

The network side device 500 provided in some embodiments of the present disclosure can implement the processes implemented by the network side device in the method embodiment of FIG. 3. To avoid repetition, details are not described herein again.

Figure 6:
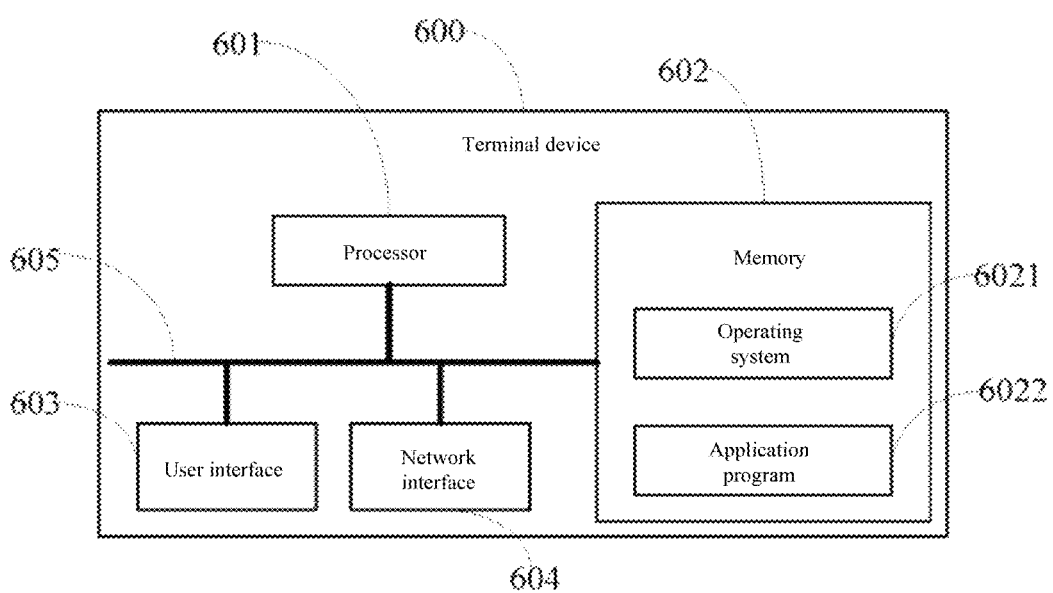
FIG. 6 is a schematic structural diagram of another terminal device according to some embodiments of the present disclosure.

FIG. 6 is a schematic structural diagram of another terminal device according to some embodiments of the present disclosure. As shown in FIG. 6, the terminal device 600 includes: at least one processor 601, a memory 602, at least one network interface 604, and a user interface 603. Various components of the terminal device 600 are coupled by using a bus system 605. It may be understood that the bus system 605 is configured to implement connection and communication between these components. In addition to a data bus, the bus system 605 may include a power bus, a control bus, and a status signal bus. However, for clarity of description, various buses are marked as the bus system 605 in FIG. 6.

The user interface 603 may include a display, a keyboard, or a clicking device (for example, a mouse, a trackball (trackball), a touch panel, or a touchscreen).

It may be understood that the memory 602 in some embodiments of the present disclosure may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. As exemplary but not limitative descriptions, many forms of RAMs may be used, for example, a static random access memory (SRAM, Static RAM), a dynamic random access memory (DRAM, Dynamic RAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 602 in the system and the method described in some embodiments of the present disclosure is intended to include, but is not limited to, these memories and memories of any other proper type.

In some implementations, the memory 602 stores the following element: an executable module or a data structure, a subset thereof, or an extended set thereof: an operating system 6021 and an application program 6022.

The operating system 6021 includes various system programs, for example, a framework layer, a kernel library layer, and a driver layer, and is configured to implement various basic services and process hardware-based tasks. The application program 6022 includes various application programs, for example, a media player (Media Player) and a browser (Browser), and is configured to implement various application services. A program for implementing the method in some embodiments of the present disclosure may be included in the application program 6022.

In some embodiments of the present disclosure, the terminal device 600 further includes: a computer program stored in the memory 602 and executable on the processor 601. When the computer program is executed by the processor 601, the following steps are performed:

receiving configuration information, where the configuration information is used to configure a plurality of semi-persistent granted resources, where each of the plurality of semi-persistent granted resources corresponds to at least one subband of an unlicensed band.

The methods disclosed in some embodiments of the present disclosure may be applied to the processor 601 or implemented by the processor 601. The processor 601 may be an integrated circuit chip having a signal processing capability. During implementation, the steps of the foregoing method may be performed by a hardware integrated logic circuit in the processor 601 or an instruction in the form of software. The processor 601 may be a general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or transistor logic device, or a discrete hardware component. The processor 601 may implement or execute the methods, steps, and logic block diagrams disclosed in some embodiments of the present disclosure. The general-purpose processor may be a microprocessor or may be any conventional processor or the like. The steps of the method disclosed in some embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 602, and the processor 601 reads information from the memory 602 and performs the steps of the foregoing method in combination with its hardware. Specifically, the computer-readable storage medium stores a computer program, and when the computer program is executed by the processor 601, the steps of the method embodiment of FIG. 2 are performed.

It may be understood that those embodiments described in some embodiments of the present disclosure may be implemented with hardware, software, firmware, middleware, microcode, or a combination thereof. For implementation with hardware, a processing unit may be implemented in one or more application-specific integrated circuits (Application-Specific Integrated Circuit, ASIC), a digital signal processor (Digital Signal Processing, DSP), a digital signal processing device (DSP Device, DSPD), a programmable logic device (Programmable Logic Device, PLD), a field-programmable gate array (Field-Programmable Gate Array, FPGA), a general-purpose processor, a controller, a microcontroller, a microprocessor, another electronic unit for implementing the functions of the present disclosure, or a combination thereof.

For implementation with software, the technology described in some embodiments of the present disclosure may be implemented by executing functional modules (for example, a process and a function) described in some embodiments of the present disclosure. Software code may be stored in the memory and executed by the processor. The memory may be implemented inside or outside the processor.

The terminal device 600 may implement the processes implemented by the terminal device in the method embodiment of FIG. 2. To avoid repetition, details are not described herein again.

Some embodiments of the present disclosure further provide a computer-readable storage medium. The computer-readable storage medium stores a computer program, and when the computer program is executed by a processor, the processes in the method embodiment of FIG. 2 are implemented, and a same technical effect can be achieved. To avoid repetition, details are not described herein. The computer-readable storage medium is, for example, a read-only memory (Read-Only Memory, ROM), a random access memory (Random Access Memory, RAM), a magnetic disk, or an optical disc.

Figure 7:
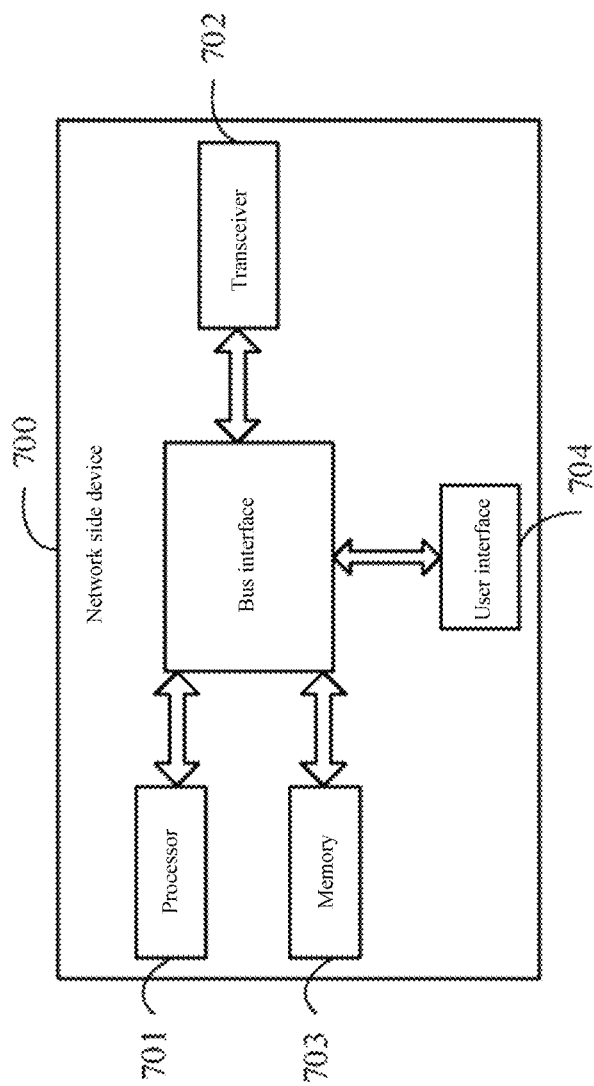
FIG. 7 is a schematic structural diagram of another network side device according to some embodiments of the present disclosure.

FIG. 7 is a schematic structural diagram of another network side device according to some embodiments of the present disclosure. The network side device 700 shown in FIG. 7 can implement the details of the method embodiment of FIG. 3 and achieve the same effect. As shown in FIG. 7, the network side device 700 includes: a processor 701, a transceiver 702, a memory 703, a user interface 704, and a bus interface.

In some embodiments of the present disclosure, the network side device 700 further includes: a computer program stored in the memory 703 and executable on the processor

701. When the computer program is executed by the processor 701, the following steps are performed:

sending configuration information, where the configuration information is used to configure a plurality of semi-persistent granted resources for a terminal device, where each of the plurality of semi-persistent granted resources corresponds to at least one subband of an unlicensed band.

In FIG. 7, the bus architecture may include any quantity of interconnected buses and bridges, which are specifically connected together by various circuits of one or more processors represented by the processor 701 and a memory represented by the memory 703. The bus architecture may further connect together various other circuits of a peripheral device, a voltage stabilizer, a power management circuit, and the like, which are well known in this field and are not further described in this specification. The bus interface provides an interface. The transceiver 702 may be a plurality of elements, that is, include a transmitter and a receiver, and provide units for communication with various other apparatuses on a transmission medium. For different user equipment, the user interface 704 may alternatively be an interface for externally and internally connecting a required device. The connected device includes, but is not limited to, a keypad, a display, a speaker, a microphone, a joystick, and the like.

The processor 701 is responsible for managing the bus architecture and performing common processing, and the memory 703 may store data used when the processor 701 performs an operation.

The network side device 700 may implement the processes implemented by the network side device in the method embodiment of FIG. 3. To avoid repetition, details are not described herein again.

Some embodiments of the present disclosure further provide a computer-readable storage medium. The computer-readable storage medium stores a computer program, and when the computer program is executed by a processor, the processes in the method embodiment of FIG. 3 are implemented, and a same technical effect can be achieved. To avoid repetition, details are not described herein. The computer-readable storage medium is, for example, a read-only memory (Read-Only Memory, ROM), a random access memory (Random Access Memory, RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a" does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of the claims, all of which fall within the protection of the present disclosure.

What is claimed is:

1. A method for semi-persistent granted uplink transmission, the method performed by a terminal device, and comprising:

receiving configuration information, wherein the configuration information is used to configure a plurality of semi-persistent granted resources, wherein each of the plurality of semi-persistent granted resources corresponds to at least one subband of an unlicensed band;

the method further comprising:

activating more than one of the plurality of semi-persistent granted resources;

wherein the activating more than one of the plurality of semi-persistent granted resources comprises:

receiving high-layer signaling, wherein the high-layer signaling is used to configure the plurality of semi-persistent granted resources; and receiving downlink activation signaling, wherein the downlink activation signaling is used to indicate activation resource identifier information, and indicate at least one subband of the unlicensed band for a semi-persistent granted resource corresponding to the activation resource identifier information, and the activation resource identifier information is used to instruct to activate more than one semi-persistent granted resources corresponding to the activation resource identifier information;

the method further comprising:

performing channel monitoring on at least one subband of the unlicensed band that corresponds to a semi-persistent granted resource in an activated state;

determining a target semi-persistent granted resource, wherein a channel monitoring result of at least one subband of the unlicensed band that corresponds to the target semi-persistent granted resource is idle; and sending an uplink data channel on the target semi-persistent granted resource;

wherein the uplink data channel carries uplink control information (UCI); and the UCI comprises identifier information of the target semi-persistent granted resource.

2. The method according to claim 1, wherein the high-layer signaling comprises: radio resource control (RRC) signaling.

3. The method according to claim 1, further comprising: deactivating one or more of semi-persistent granted resources in an activated state.

4. The method according to claim 3, wherein the deactivating one or more of semi-persistent granted resources in an activated state comprises:

receiving downlink deactivation signaling, wherein the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

5. A terminal device, comprising: a memory, a processor, and a computer program stored in the memory and executable on the processor, wherein when the computer program is executed by the processor, steps of a method for semi-persistent granted uplink transmission are performed, the method comprising:
receiving configuration information, wherein the configuration information is used to configure a plurality of semi-persistent granted resources, wherein
each of the plurality of semi-persistent granted resources corresponds to at least one subband of an unlicensed band;
the method further comprising:
activating more than one of the plurality of semi-persistent granted resources;
wherein the activating more than one of the plurality of semi-persistent granted resources comprises:
receiving high-layer signaling, wherein the high-layer signaling is used to configure the plurality of semi-persistent granted resources; and
receiving downlink activation signaling, wherein the downlink activation signaling is used to indicate activation resource identifier information, and indicate at least one subband of the unlicensed band for a semi-persistent granted resource corresponding to the activation resource identifier information, and the activation resource identifier information is used to instruct to activate more than one semi-persistent granted resources corresponding to the activation resource identifier information;
the method further comprising:
performing channel monitoring on at least one subband of the unlicensed band that corresponds to a semi-persistent granted resource in an activated state;
determining a target semi-persistent granted resource, wherein a channel monitoring result of at least one subband of the unlicensed band that corresponds to the target semi-persistent granted resource is idle; and
sending an uplink data channel on the target semi-persistent granted resource;
wherein the uplink data channel carries uplink control information (UCI); and
the UCI comprises identifier information of the target semi-persistent granted resource.

6. The terminal device according to claim 5, wherein in the method for semi-persistent granted uplink transmission performed when the computer program is executed by the processor, the high-layer signaling comprises: radio resource control (RRC) signaling.

7. The terminal device according to claim 5, wherein the method for semi-persistent granted uplink transmission performed when the computer program is executed by the processor, further comprising:
deactivating one or more of semi-persistent granted resources in an activated state.

8. The terminal device according to claim 7, wherein in the method for semi-persistent granted uplink transmission performed when the computer program is executed by the processor, the deactivating one or more of semi-persistent granted resources in an activated state comprises:
receiving downlink deactivation signaling, wherein the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

9. A computer-readable storage medium, wherein the computer-readable storage medium stores a computer program, and when the computer program is executed by a processor, steps of a method for semi-persistent granted uplink transmission are performed, the method comprising:
receiving configuration information, wherein the configuration information is used to configure a plurality of semi-persistent granted resources, wherein
each of the plurality of semi-persistent granted resources corresponds to at least one subband of an unlicensed band;
wherein the method for semi-persistent granted uplink transmission performed when the computer program is executed by the processor further comprises:
activating more than one of the plurality of semi-persistent granted resources;
wherein the activating more than one of the plurality of semi-persistent granted resources comprises:
receiving high-layer signaling, wherein the high-layer signaling is used to configure the plurality of semi-persistent granted resources; and
receiving downlink activation signaling, wherein the downlink activation signaling is used to indicate activation resource identifier information, and indicate at least one subband of the unlicensed band for a semi-persistent granted resource corresponding to the activation resource identifier information, and the activation resource identifier information is used to instruct to activate more than one semi-persistent granted resources corresponding to the activation resource identifier information;
wherein the method for semi-persistent granted uplink transmission performed when the computer program is executed by the processor further comprises:
performing channel monitoring on at least one subband of the unlicensed band that corresponds to a semi-persistent granted resource in an activated state;
determining a target semi-persistent granted resource, wherein a channel monitoring result of at least one subband of the unlicensed band that corresponds to the target semi-persistent granted resource is idle; and
sending an uplink data channel on the target semi-persistent granted resource;
wherein the uplink data channel carries uplink control information (UCI); and
the UCI comprises identifier information of the target semi-persistent granted resource.

10. The storage medium according to claim 9, wherein the high-layer signaling comprises: radio resource control (RRC) signaling.

11. The terminal device according to claim 9, wherein the method for semi-persistent granted uplink transmission performed when the computer program is executed by the processor, further comprising:
deactivating one or more of semi-persistent granted resources in an activated state.

12. The terminal device according to claim 11, wherein in the method for semi-persistent granted uplink transmission performed when the computer program is executed by the processor, the deactivating one or more of semi-persistent granted resources in an activated state comprises:
   receiving downlink deactivation signaling, wherein the downlink deactivation signaling is used to indicate at least one piece of deactivation resource identifier information, and the at least one piece of deactivation resource identifier information is used to instruct to deactivate a semi-persistent granted resource corresponding to each of the at least one piece of deactivation resource identifier information.

* * * * *